US007379594B2

(12) United States Patent
Ferman et al.

(10) Patent No.: US 7,379,594 B2
(45) Date of Patent: May 27, 2008

(54) METHODS AND SYSTEMS FOR AUTOMATIC DETECTION OF CONTINUOUS-TONE REGIONS IN DOCUMENT IMAGES

(75) Inventors: A. Mufit Ferman, Vancouver, WA (US); Richard J. Campbell, Camas, WA (US); John E. Dolan, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 641 days.

(21) Appl. No.: 10/767,394

(22) Filed: Jan. 28, 2004

(65) Prior Publication Data

US 2005/0163374 A1 Jul. 28, 2005

(51) Int. Cl.
*G06K 9/34* (2006.01)
(52) U.S. Cl. ..................... 382/176; 382/173
(58) Field of Classification Search ............. 382/176, 382/180, 308, 171
See application file for complete search history.

(56) References Cited

U.S. PATENT DOCUMENTS

| | | | |
|---|---|---|---|
| 4,998,122 A | 3/1991 | Kanno et al. | 382/462 |
| 5,121,224 A | 6/1992 | Ng et al. | 382/462 |
| 5,177,795 A | 1/1993 | Tanioka et al. | 382/270 |
| 5,202,933 A | 4/1993 | Bloomberg | 382/176 |
| 5,278,919 A | 1/1994 | Sugiura et al. | 382/176 |
| 5,280,367 A | 1/1994 | Zuniga | 382/462 |
| 5,369,507 A | 11/1994 | Tanaka et al. | 382/462 |
| 5,546,474 A | 8/1996 | Zuniga | 382/176 |
| 5,555,556 A | 9/1996 | Ozaki | 382/173 |
| 5,587,808 A | 12/1996 | Hagihara et al. | 382/462 |
| 5,767,978 A | 6/1998 | Revankar et al. | 382/296 |
| 5,778,092 A | 7/1998 | MacLeod et al. | 382/176 |
| 5,812,695 A | 9/1998 | Dawe | 382/176 |
| 5,883,973 A | 3/1999 | Pascovici et al. | 382/176 |
| 5,892,843 A | 4/1999 | Zhou et al. | 382/176 |
| 6,088,392 A * | 7/2000 | Rosenberg | 375/240.03 |
| 6,181,829 B1 | 1/2001 | Clark et al. | 382/273 |
| 6,185,328 B1 | 2/2001 | Shiau | 382/173 |
| 6,229,923 B1 | 5/2001 | Williams et al. | 382/224 |
| 6,295,371 B1 | 9/2001 | Rucklidge et al. | 382/176 |
| 6,301,386 B1 | 10/2001 | Zhu et al. | 382/176 |
| 6,347,153 B1 | 2/2002 | Triplett et al. | 382/224 |
| 6,393,150 B1 | 5/2002 | Lee et al. | 382/176 |
| 6,411,735 B1 | 6/2002 | Williams et al. | 382/224 |
| 6,424,742 B2 | 7/2002 | Yamamoto et al. | 382/173 |
| 6,437,881 B1 | 8/2002 | Baba et al. | 382/434 |
| 6,449,396 B1 * | 9/2002 | Loce et al. | 382/276 |
| 6,507,670 B1 | 1/2003 | Moed | 382/172 |
| 6,564,176 B2 * | 5/2003 | Kadtke et al. | 702/189 |
| 6,628,833 B1 * | 9/2003 | Horie | 382/173 |
| 6,687,400 B1 * | 2/2004 | Szeliski | 382/168 |
| 6,731,800 B1 * | 5/2004 | Barthel et al. | 382/176 |
| 6,952,502 B2 * | 10/2005 | Gil et al. | 382/257 |
| 6,973,213 B2 * | 12/2005 | Fan et al. | 382/176 |

(Continued)

*Primary Examiner*—Jingge Wu
*Assistant Examiner*—Amara Abdi
(74) *Attorney, Agent, or Firm*—Krieger Intellectual Property, Inc.

(57) ABSTRACT

Methods and systems for segmentation of digital mixed-content documents. Segmentation processes may include identification of text and background regions and identification of contone regions outside the text and background regions. Further analysis may be performed to identify additional text and background regions within the contone regions thereby identifying verified contone regions, which may then be divided into contone sub-regions.

2 Claims, 21 Drawing Sheets

U.S. PATENT DOCUMENTS

| | | | |
|---|---|---|---|
| 6,985,612 B2 * | 1/2006 | Hahn | 382/128 |
| 2002/0006220 A1 | 1/2002 | Kohchi | 382/165 |
| 2002/0076107 A1 | 6/2002 | Loce et al. | 382/209 |
| 2002/0149578 A1 * | 10/2002 | Atkins | 345/418 |
| 2004/0017579 A1 * | 1/2004 | Lim | 358/1.9 |

* cited by examiner

Segmentation Test Image 1

This is a test of SLA page segmentation for 2 classes, (contone and other). This should successfully distinguish color and grayscale contones from spot color patches and text areas. Therefore this target contains at least one example of each of these events. Blah blah blah blah blah blah blah blah blah blah. Therefore this target contains at least one example of each of these events. Blah blah blah blah blah blah.

Red Tent

This is a test of SLA page segmentation for 2 classes, (contone and other). This should successfully distinguish color and grayscale contones from spot color patches and text areas. Therefore this target contains at least one example of each of these events. Blah blah blah blah blah blah blah blah blah blah. Therefore this target contains at least one example of each of these events. Blah blah blah blah blah blah. This is a test of SLA page segmentation for 2 classes, (contone and other). This should successfully distinguish color and grayscale contones from spot color patches and text areas. Therefore this target contains at least one example of each of these events.

This is a test of SLA page segmentation for 2 classes, (contone and other). This should successfully distinguish color and grayscale contones from spot color patches and text areas. Therefore this target contains at least one example of each of these events. Blah blah blah blah blah blah blah blah blah blah. Therefore this target contains at least one example of each of these events. Blah blah blah blah blah blah.

This is a test of SLA page segmentation for 2 classes, (contone and other). This should successfully distinguish color and grayscale contones from spot color patches and text areas. Therefore this target contains at least one example of each of these events. Blah blah blah blah blah blah blah blah blah blah. Therefore this target contains at least one example of each of these events. Blah blah blah blah blah blah.

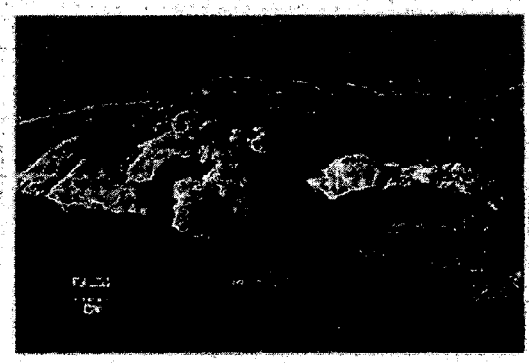

Gray Rocks

This is a test of SLA page segmentation for 2 classes, (contone and other). This should successfully distinguish color and grayscale contones from spot color patches and text areas.

METHODS AND SYSTEMS FOR AUTOMATIC DETECTION OF CONTINUOUS-TONE REGIONS IN DOCUMENT IMAGES

BACKGROUND OF THE INVENTION

Digital documents can be ameliorated through document processing that enhances the color, contrast and other attributes of the document. Different processing methods are used to enhance different content types. In some cases, processing that enhances one content type will degrade another content type. For example, a process that enhances the legibility of text may degrade attributes of a continuous-tone (contone) image, such as a digital photograph. In mixed-content documents, different content types must be segmented in order to provide optimum document processing. Content types include contone images, halftone images, text and others. Some document types can be further delineated for more optimal processing. For example, contone regions can be separated into pictorial and non-pictorial regions.

The identification and delineation of document areas by content type is an essential part of segmentation for document processing. Once each document region is segmented, each region can be processed separately according to the specific needs of the content type.

BRIEF DESCRIPTION OF THE DRAWINGS

FIG. 4(a) shows a mixed content image similar to the image shown in FIG. 2(a), but printed on colored paper;

FIG. 5(b) shows a chroma foreground mask in a format similar to that of FIG. 5(a);

DETAILED DESCRIPTION OF THE INVENTION

Figure 1A:
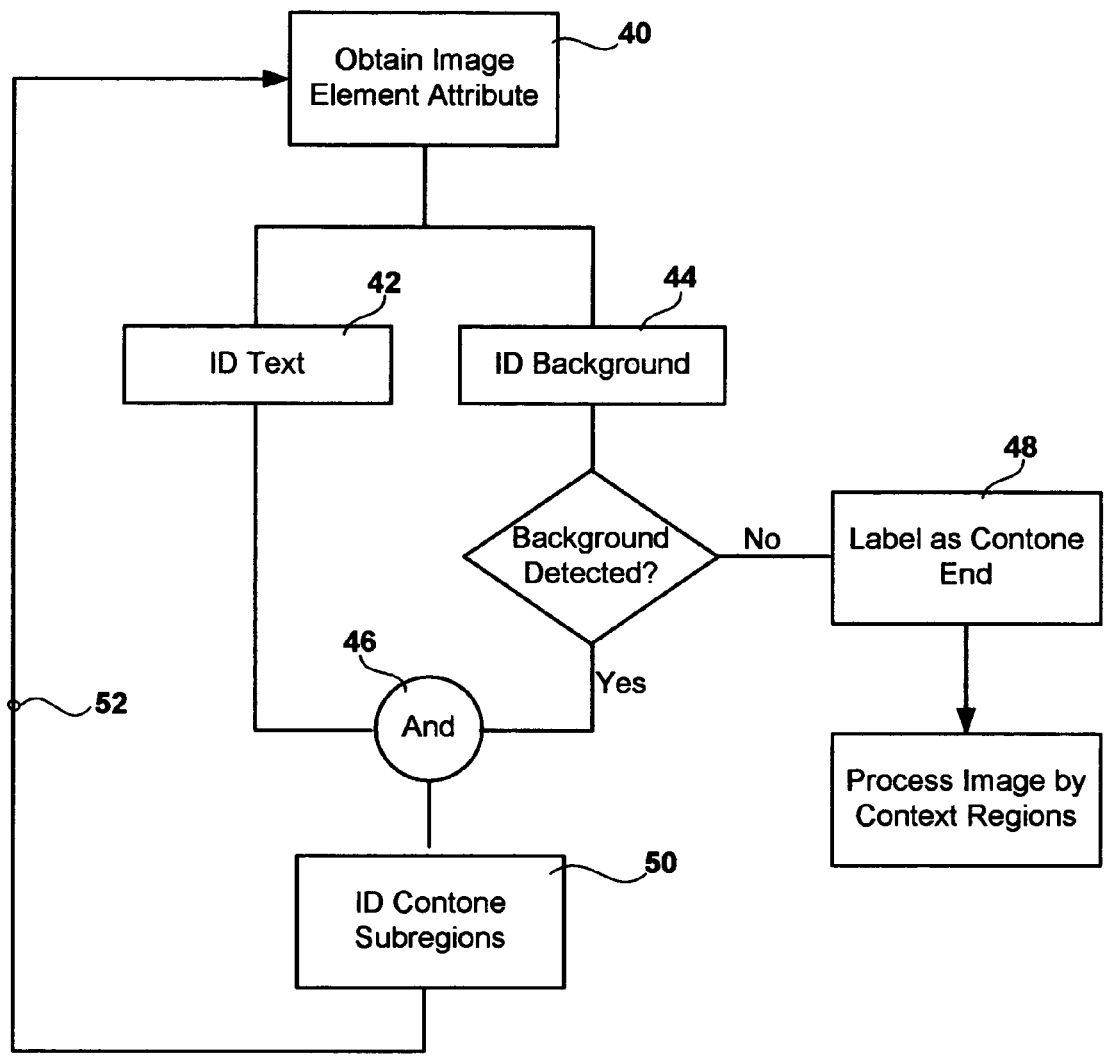
FIG. 1(a) is a diagram depicting the steps of some simplified embodiments of the present invention.

Referring in detail to the drawings wherein similar parts of the invention are identified by like reference numerals.

Embodiments of the present invention comprise methods and systems for identification and delineation of continuous-tone (contone) regions in a digital mixed-content document. These documents comprise documents that have been digitally scanned and which contain a mixture of objects such as text, halftone, pictorial contone and non-pictorial contone elements. When selective treatment of each content type is desired, content types must be segmented.

The primary motivation for segmenting pictorial contone elements is to support image enhancements that are specifically tuned to the individual image properties of the region. For example, focus, exposure, color-balance and other attributes can be enhanced and corrected. When these content regions are segmented and enhanced separately, each region of the document can be enhanced without deleterious effects on other regions.

To properly detect pictorial contone regions, two key discriminations should be made: 1) distinguishing text from contone regions and 2) distinguishing pictorial from non-pictorial contone regions. The issue with text is that it shares many local properties with contone regions—e.g., large local variance at edges and local uniformity in interior areas. Since contone image enhancements are highly detrimental to text legibility, it is beneficial to eliminate all false-positive classifications of text as contone. The issue with non-pictorial contone regions has mainly to do with the cost of the proposed image enhancements and the fact that such computation, if not deleterious, would be largely wasted on non-pictorial regions. Therefore, eliminating non-pictorial false-positives is highly desirable as well.

Embodiments of the present invention comprise methods and systems for segmentation of image content types. These types comprise text, background, pictorial contone, non-pictorial contone and others. Image element attributes such as luminance, chrominance, hue and other attributes may be used to detect and delineate image content types. In some embodiments of the present invention, only the luminance component of the input image is utilized. In other embodiments the chrominance components and/or color and hue attributes, as well as other attributes, may be used to improve the accuracy or other performance characteristics of the algorithm.

Figure 2A:
FIG. 2(a) shows a typical mixed-content document.

Embodiments of the present invention may process many types of digital images. These images may be obtained from a scanner, from a digital camera or from another apparatus that converts physical media into a digital file. These images may also be originally generated on a computer such as through the use of a graphics application as well as by other methods. A typical mixed-content image is shown in FIG. 2(a).

Some embodiments of the present invention may be described with reference to FIG. 1(a). In these embodiments, image element attributes are obtained 40 by known methods, such as by reading an image file. These attributes may comprise pixel luminance and chrominance values as well as other information. Image element attribute data may be filtered to remove noise and/or downsampled to make the image data easier to analyze and store. In these embodiments, image data is analyzed to determine whether text regions are present in the image 42. This may be performed by local computation of a discriminating feature such as standard deviation, spread or some other feature. Once text regions are located, they are bounded and tagged as text or non-contone regions.

Background regions are also detected 44 and tagged by methods explained below as well as other methods. These methods may comprise analysis of luminance histogram data including a determination of the histogram bin containing the maximum number of image pixels when this value is above a threshold value. An analysis of neighboring histogram bins may also be used to modify the background detection routine.

Once text and background regions are found, these regions may be combined 46 and eliminated from consideration in the contone detection process. If no background or text is found, the entire image may be tagged as a contone region 48.

When background and text regions are found, the remainder of the image may be analyzed to identify contone regions 50. This analysis may comprise an analysis of the region's luminance histogram data. As contone regions typically have a uniformly-distributed histogram, this feature may be used to identify these regions. In some embodiments, the number of populated histogram bins whose pixel count exceeds a threshold value is compared to a bin number threshold value. When the number of bins exceeds this value, the regions is considered a contone region.

In some embodiments, this determination is subject to modification in a secondary determination using regional properties. In these embodiments, regional properties, such as region area and luminance distribution are considered. If a region's area is smaller than a particular area threshold value, the region may be removed from consideration as a contone region. In some embodiments, the area threshold value may be related to a page characteristic, such as page width. In particular embodiments, the area threshold value may be equal to the square of one tenth of the page width.

A further regional property may be used to further identify a contone region as a pictorial contone region. In these embodiments, the luminance histogram data is analyzed. The two dominant histogram bins are removed from consideration and the remaining bins are analyzed to determine whether they represent a typical bi-modal distribution. If the distribution is more varied than bi-modal, the region is considered pictorial.

Once initial regions have been identified, embodiments of the present invention may recursively analyze these regions 52 to identify sub-regions that may exist within each region. This process may continue recursively until each sub-region is homogenous.

Figure 1B:
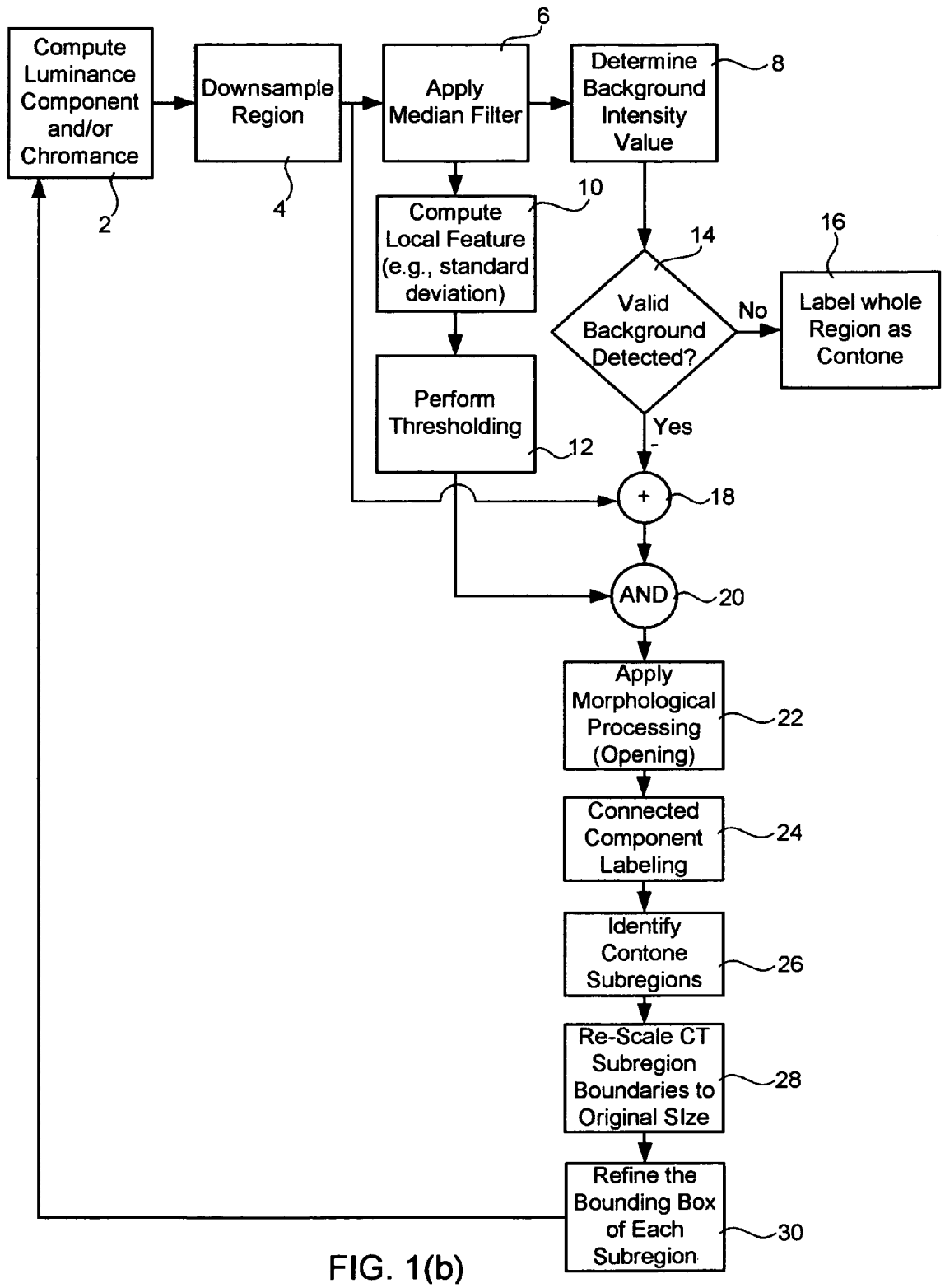
FIG. 1(b) is a diagram depicting the steps of other embodiments of the present invention.

Some embodiments of the present invention may be described with reference to FIG. 1(b). In these embodiments, the input image may be optionally downsampled 4 to generate a low-DPI (dots-per-inch) version, in order to significantly reduce the memory overhead of the algorithm and to reduce the required calculation resources. Some embodiments may not downsample when sufficient processing resources are available. After downsampling or the omission thereof, the input image is processed to reduce the effects of noise 6.

In some embodiments, a 3×3 median filter is used to process the image 6; however, alternative filtering or image processing methods can also be used to reduce the noise in the image data. After the pre-processing step, a discriminating feature is computed locally 10 for each pixel to highlight and subsequently identify the text regions in the image. In some embodiments, the discriminating feature is the standard deviation, calculated for each pixel using a 5×5 window.

Other embodiments can utilize alternative local features, such as the spread, which is defined as the number of pixels in a local window not equal to the maximum or the minimum values in the window.

Figure 2B:
FIG. 2(b) shows the local standard deviation of the luminance component of the image in FIG. 2(a)

FIG. 2(b) shows the local standard deviation feature computed for the sample document image in FIG. 2(a). It is clear in FIG. 2(b) that the standard deviation values tend to be higher in the text regions of the document image.

Figure 2C:
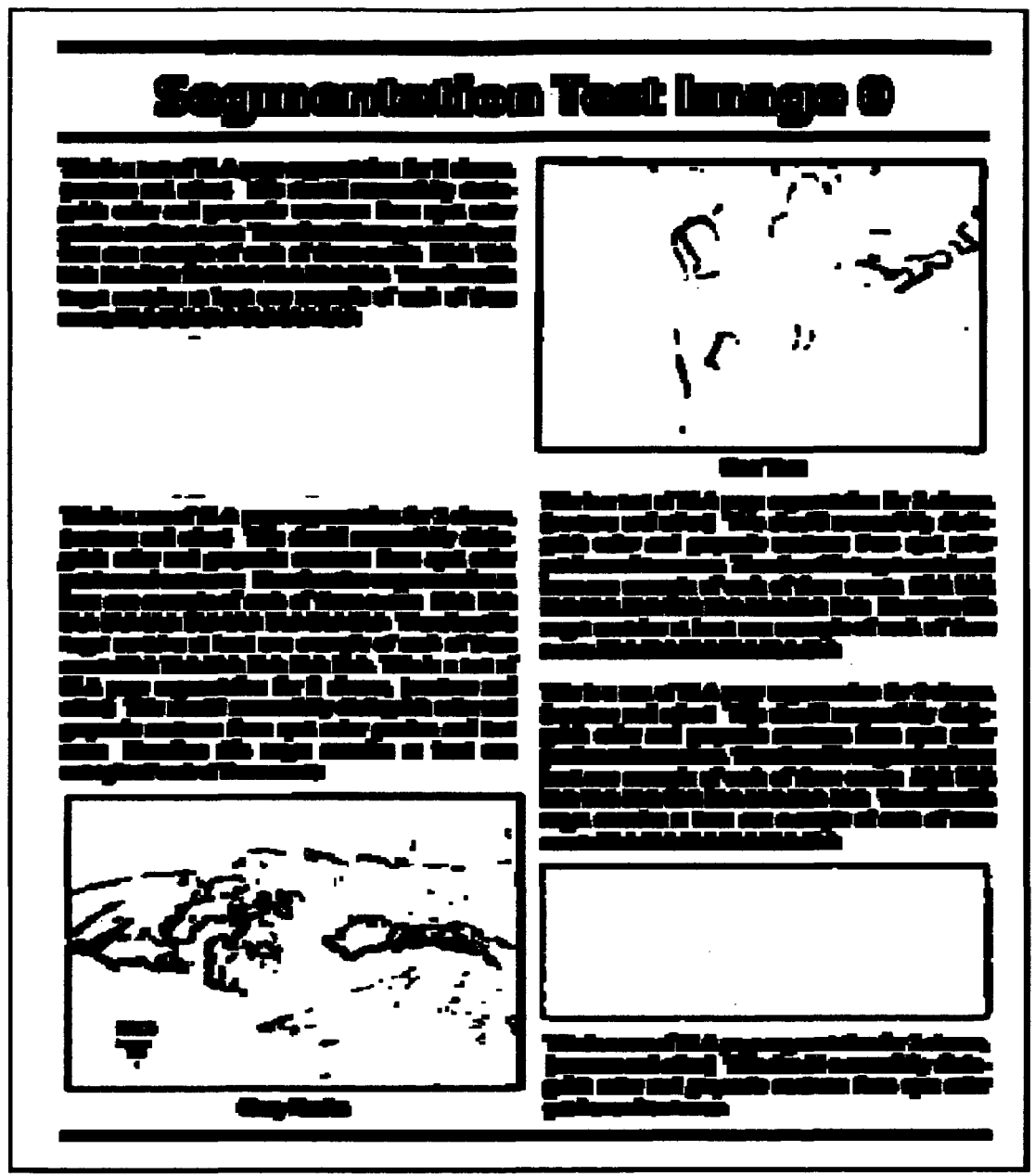
FIG. 2(c) shows a mask image obtained by thresholding standard deviation with non-text regions shown in white.
Figure 2D:
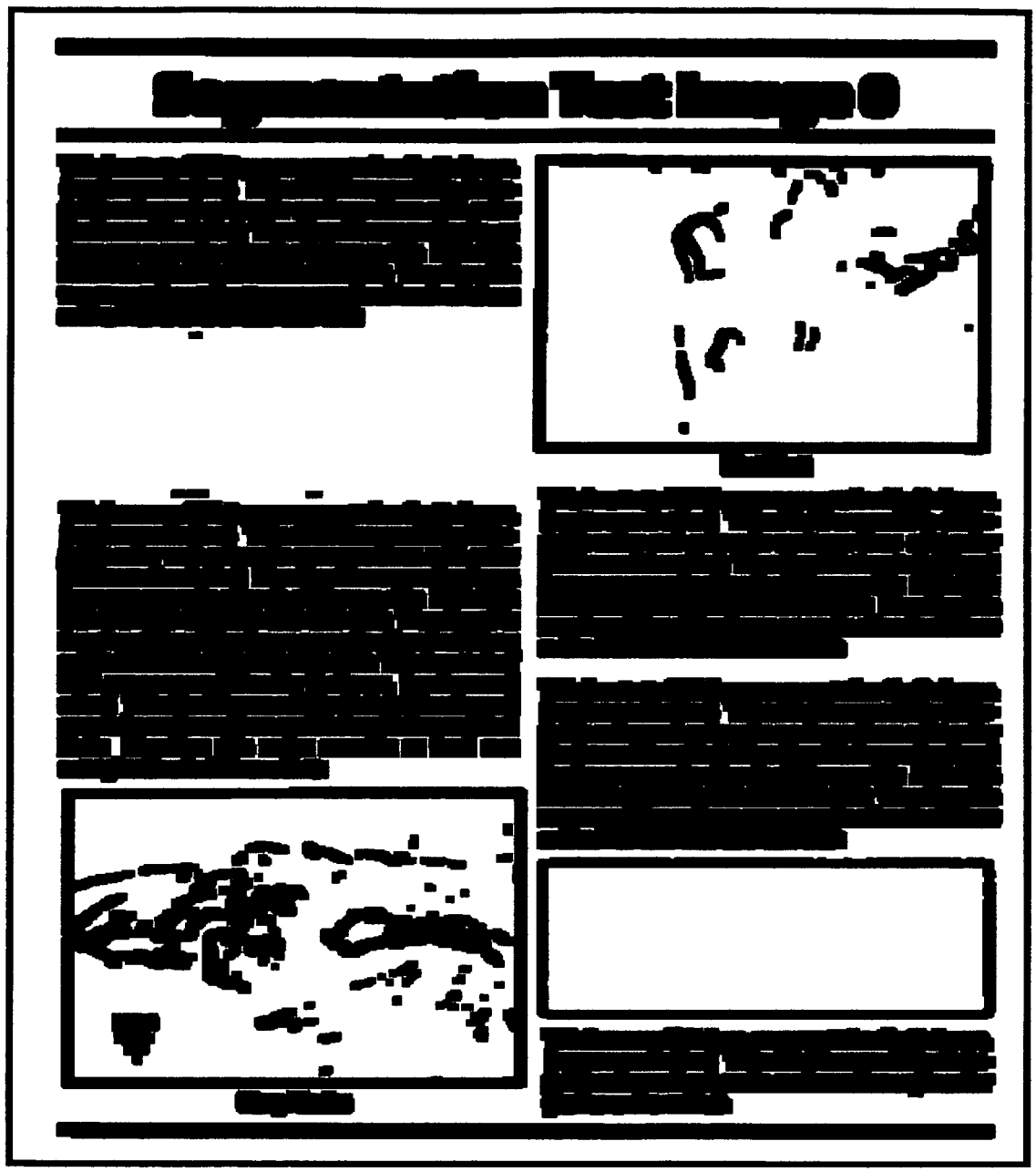
FIG. 2(d) shows a mask image after morphological processing.

This property is exploited through a thresholding operation 12 to discard the text areas in the image and locate a set of candidate regions on the page that may correspond to continuous-tone content. FIG. 2(c) shows the mask generated from the standard deviation image by thresholding; the white areas in the mask correspond to non-text locations whose standard deviation value is below the predetermined threshold $T_T$. The value of $T_T$ can be chosen in different ways. In some embodiments, $T_T$ is set to 32 for all input content. After thresholding, the mask image is processed using morphological methods 22 such as erosion and opening to eliminate small, isolated regions. The final mask image obtained after morphological processing is shown in FIG. 2(d).

The initial mask of candidate continuous-tone regions can be further improved by identification and removal of the background pixels in the document image. In some embodiments of the present invention, the range of gray level values that correspond to the background can be determined 8 through analysis of the luminance histogram of the document region. The main assumption is that the background pixels comprise a considerable portion of the region of interest, which in turn implies that these pixels constitute a significant peak in the luminance histogram.

To detect the document background 14, the gray level values in the luminance histogram that correspond to the bin with the maximum number of pixels are taken as the initial estimate of the region background. The pixel count in the selected bin must exceed a predetermined threshold to be classified as a potential background; otherwise, it is determined that no distinct background exists for the region of interest. If no distinct background exists, the entire region may be labeled as contone 16. The background detection threshold $T_B$ can be set in various ways. In some embodiments, $T_B$ is computed as 12.5% of the input image size. After the initial range estimate for the background is computed, it may be further expanded through analysis of the neighboring bins in the histogram. This latter stage renders the algorithm more robust to the effects of noise, blur due to scanner characteristics, and so on. Furthermore, the background detection method is able to identify background regions of any color, since no assumption is made during histogram analysis on where the largest peak may be located. The number of bins $N_B$ used to construct the luminance histogram may vary. In some current embodiments of the invention, $N_B$ is set to 64. The background mask image is finally processed using morphological methods such as erosion and opening to eliminate small, isolated regions 22.

Figure 3A:
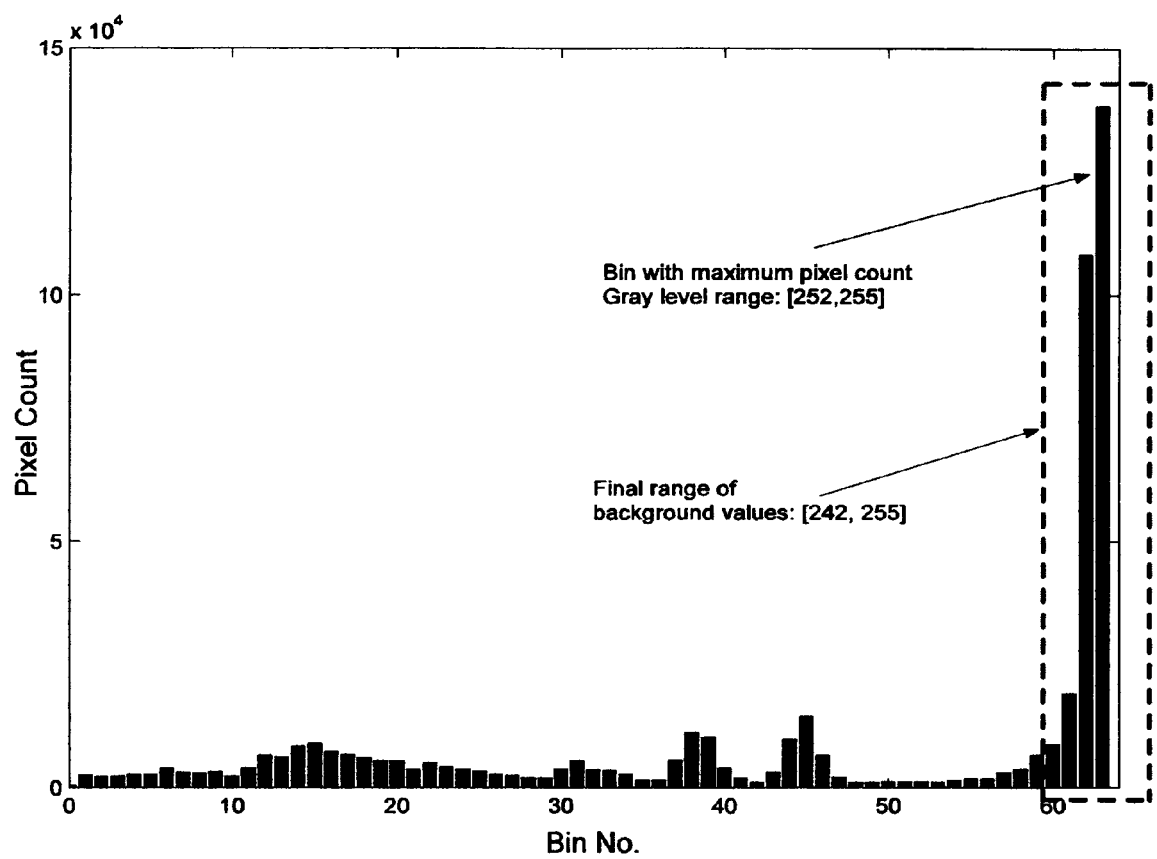
FIG. 3(a) shows a 64 bin luminance histogram of the input image shown in FIG. 2(a)
Figure 3B:
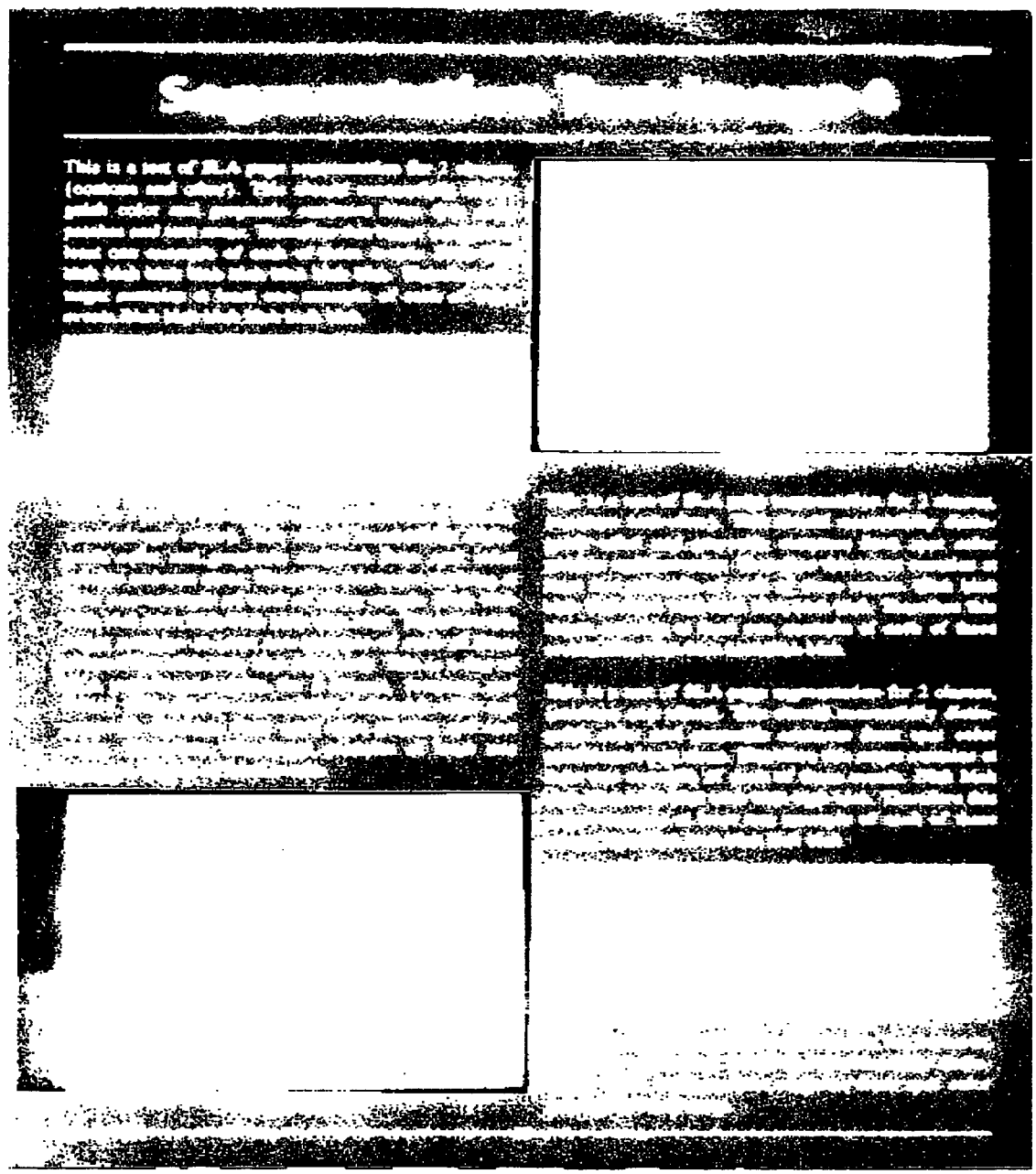
FIG. 3(b) shows the pixels found in the most populated bin of the histogram shown in FIG. 3(a) for the input image shown in FIG. 2(a)
Figure 3C:
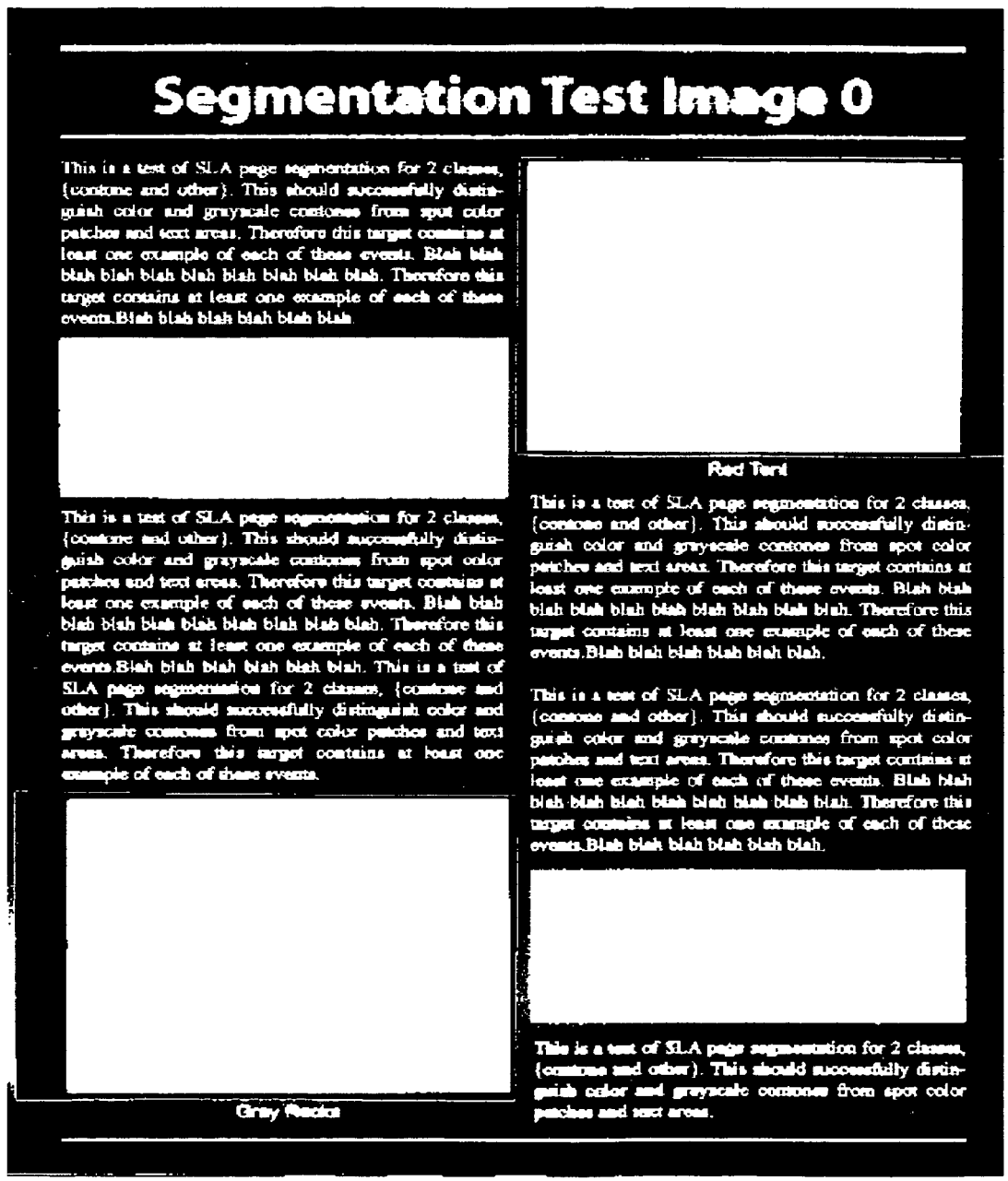
FIG. 3(c) shows the image shown in FIG. 3(b) with background value extension.

FIG. 3 illustrates the background detection process of some embodiments in more detail. The document image of interest is shown in FIG. 2(a). FIG. 3(a) shows the luminance histogram $H_{lum}$ computed for the entire page. As seen in FIG. 3(a), the bin with the maximum number of pixels in $H_{lum}$ is bin no. 64, which corresponds to the gray level range [252,255]. The document pixels that correspond to this range of values are depicted in FIG. 3(b) in black. The range is then progressively expanded at either end, by incrementing (decrementing) the upper (lower) bound of the range by 1, and determining if the number of pixels added through this operation is sufficient. If the number of pixels added through the expansion exceeds a predetermined threshold, the background range is increased to include the new gray level value; otherwise, the expansion process is terminated. FIG. 3(c) shows the document pixels that correspond to the final background range.

Figure 4B:
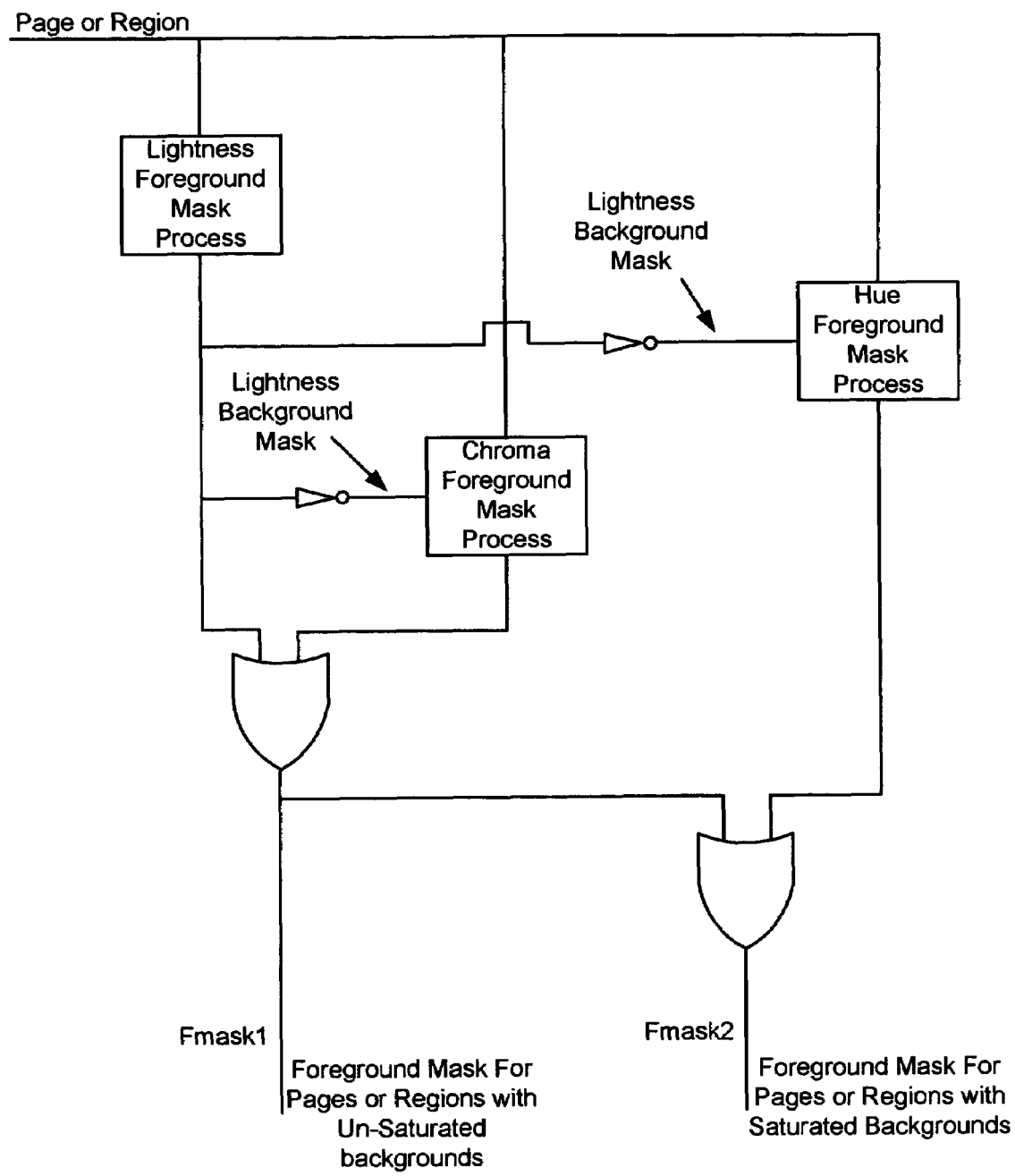
FIG. 4(b) shows a logic diagram for the calculation of a foreground mask.
Figure 4C:
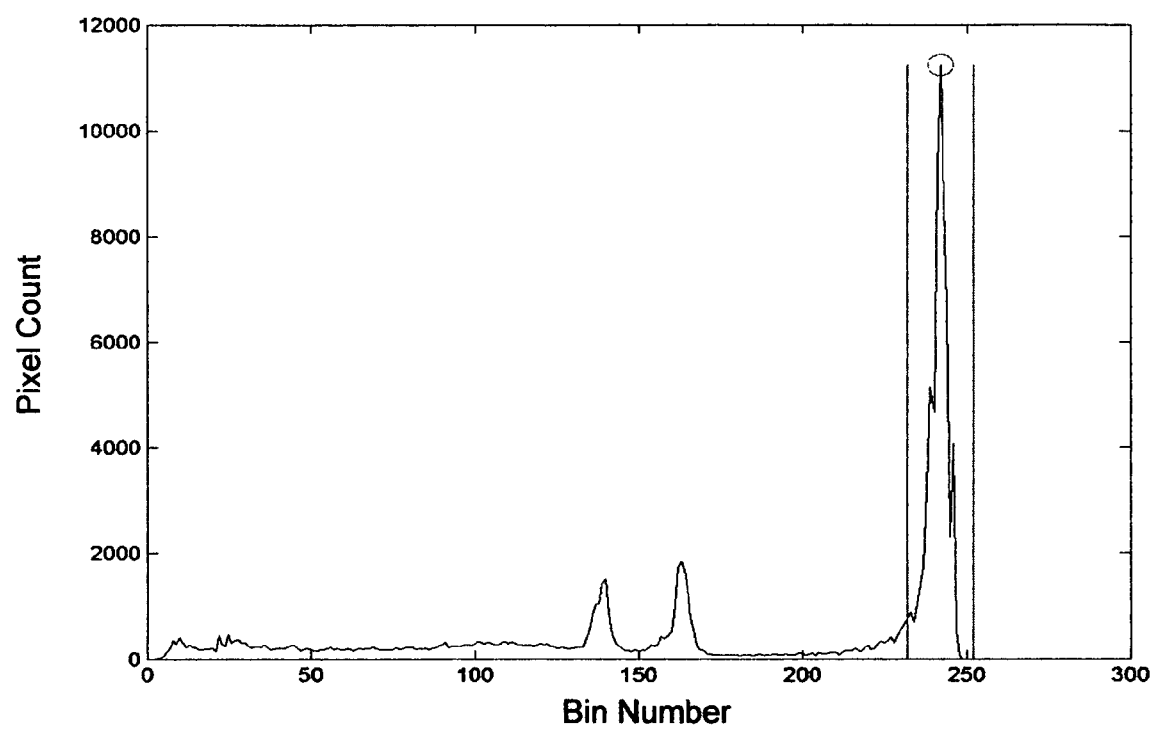
FIG. 4(c) shows a histogram for a mixed-content page on a colored background.
Figure 5A:
FIG. 5(a) shows a lightness foreground mask where black regions correspond to background pixels and white regions correspond to foreground pixels.
Figure 5B:
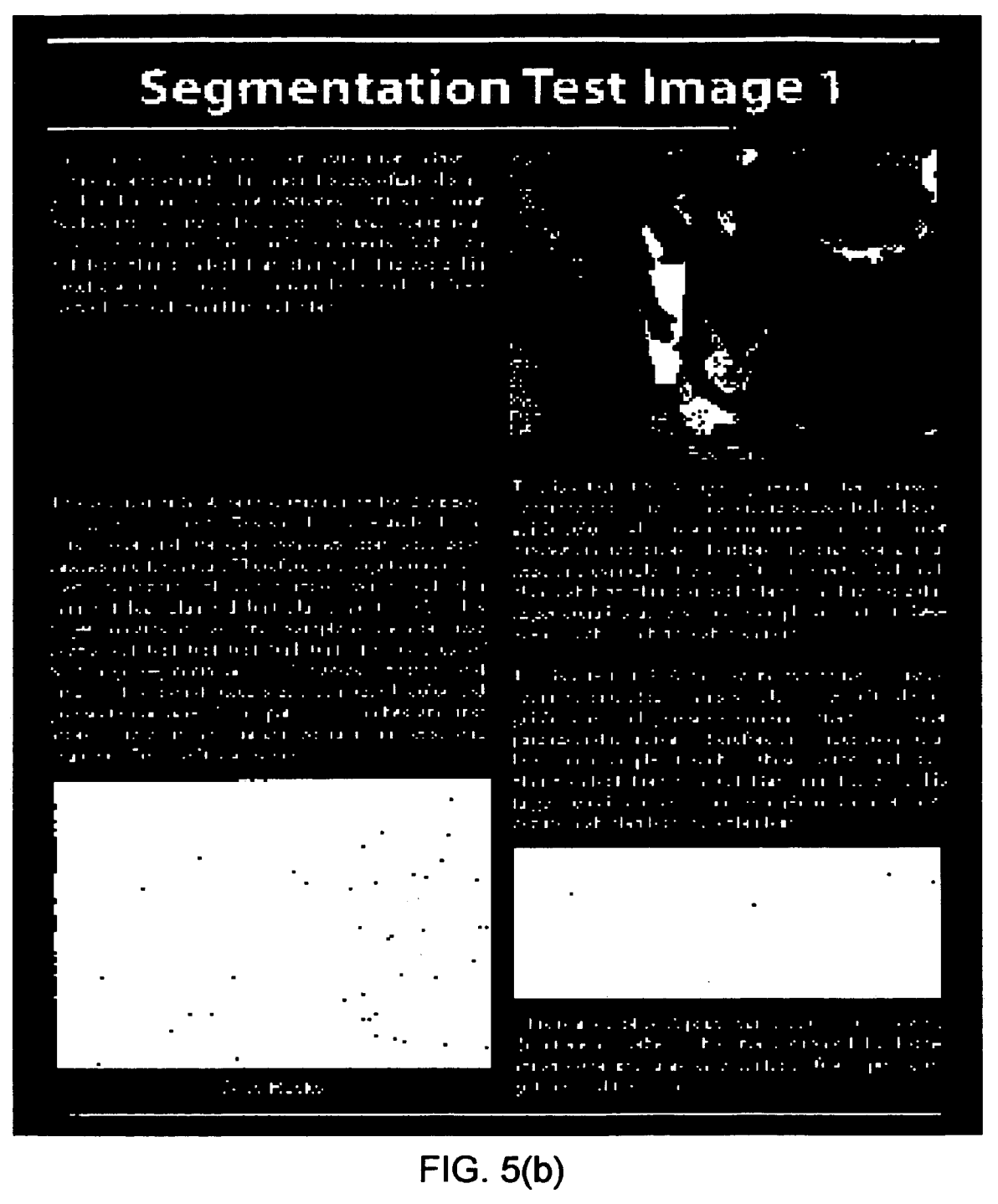
Figure 5C:
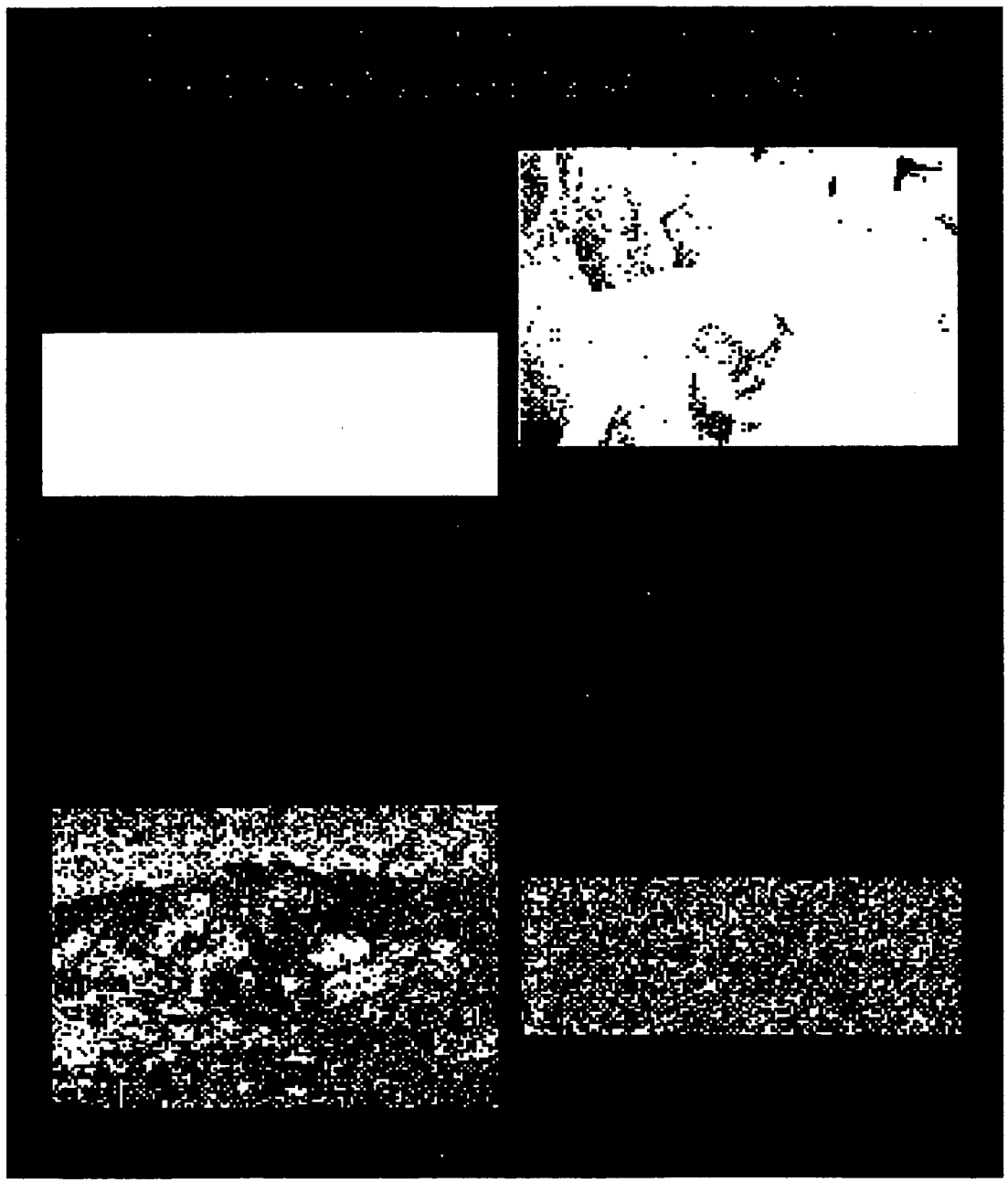
FIG. 5(c) shows a hue foreground mask in a format similar to that of FIG. 5(a)
Figure 5D:
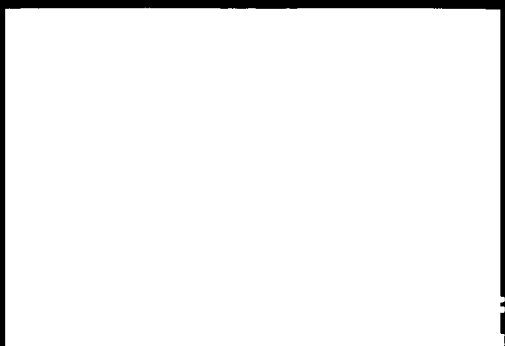
FIG. 5(d) shows the result of an OR operation of the masks in FIGS. 5a-c.

Methods that use only luminance channel information about a document page may be throwing away valuable information that could be used to further narrow the background pixels specification. To try and take advantage of the information carried by the color channels, another set of embodiments has been developed that may use luminance, chroma and hue channels. These alternative embodiments are illustrated in FIG. 4 with results of the various steps shown in FIG. 5. The method first calculates a luminance channel histogram similar to the previous embodiment shown in FIG. 2. The peak of this histogram is assumed to correspond to the main background luminance level. A region is then carved out from the histogram based on noise and MTF measurements to identify the luminance levels that are likely to still belong to the background. FIG. 4(c) illustrates the luminance histogram for the document shown in FIG. 4(a) and the area between the vertical lines 56 & 58 corresponds to the luminance levels of the background. Only the pixels denoted as background in FIG. 5(a) are run through a similar process for chroma and hue channels. This narrows the definition of the background and allows more foreground pixels mislabeled by the luminance criterion to be re-added to the foreground in the final mask denoted in FIG. 5(d).

Figure 6A:
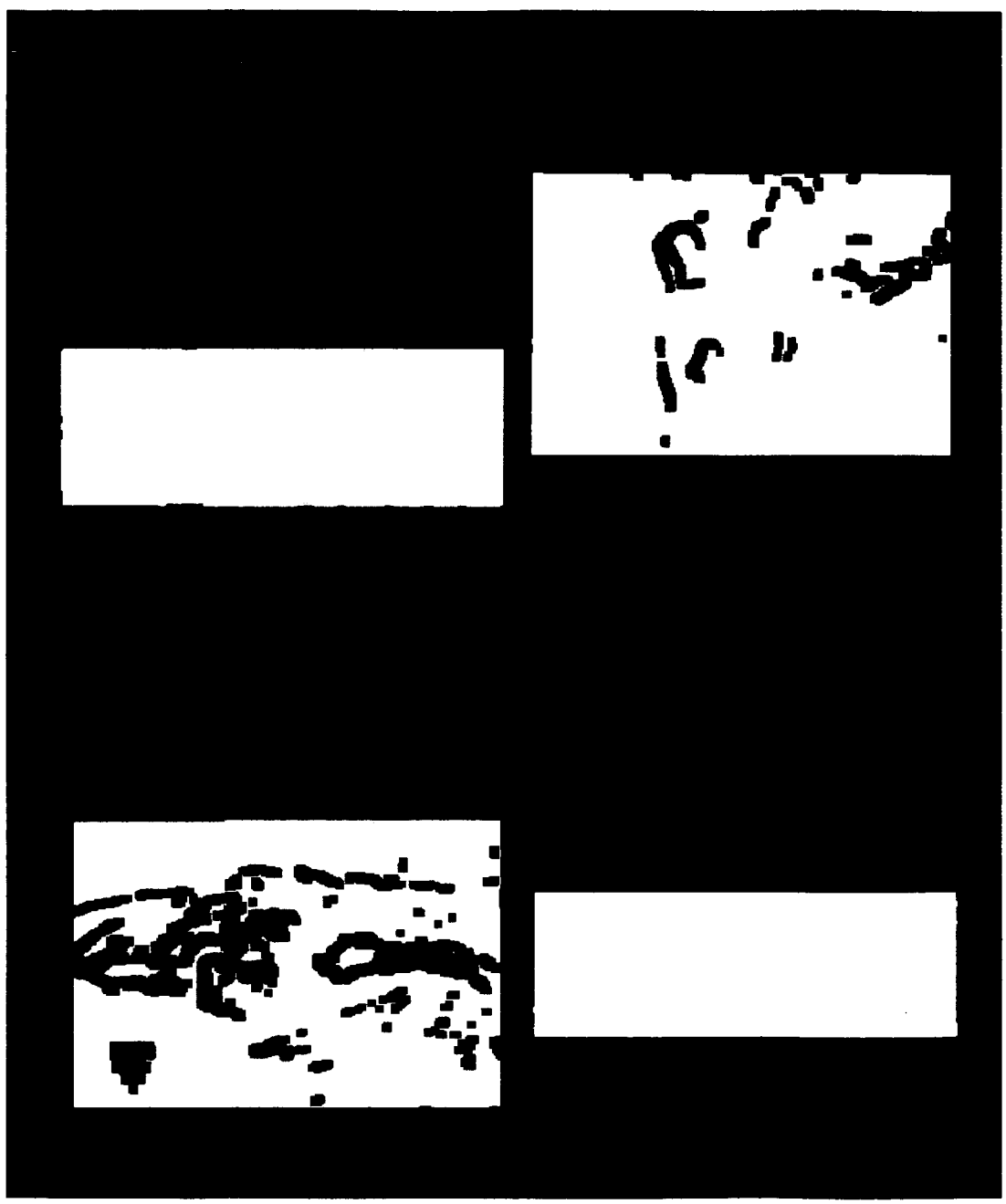
FIG. 6(a) shows a final candidate region mask obtained by ANDing the local feature mask (FIG. 2(d)) and the background mask (FIG. 3(c))
Figure 6B:
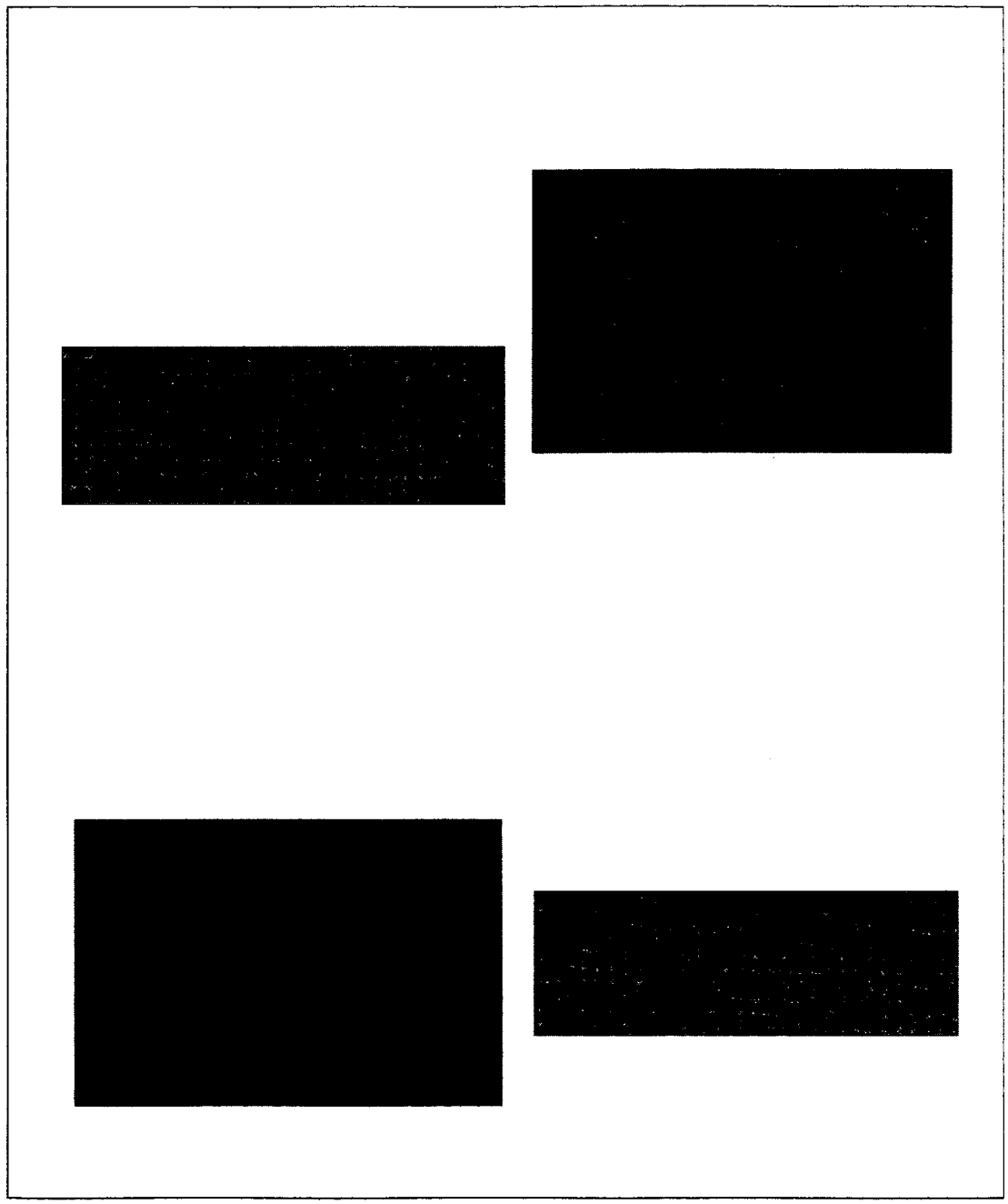
FIG. 6(b) shows a final set of candidate regions after connected component labeling and bounding box computation.

The binary masks obtained through background detection and local analysis are then merged 20 through an AND operation to yield the set of candidate continuous-tone regions. The merging process allows us to eliminate the text regions completely, to reduce the number of candidate locations and to refine their boundaries. FIG. 6(a) shows the results of the AND operation on the masks. Connected component labeling 24 is then performed on the mask to determine the number and locations of the connected image regions. Finally, the bounding box of each labeled region is computed to generate the final mask, as depicted in FIG. 6(b). The shaded regions in the mask correspond to the non-text, non-background regions that will be further analyzed and labeled as 'contone' or 'non-contone'.

Once the candidate regions in the document are identified, the luminance histogram of each region is inspected to decide whether the region is continuous-tone 26. The decision is typically made based on regional histogram uniformity. A continuous-tone image region is expected to have a fairly uniform gray level distribution, whereas a spot color area often has a heavily skewed histogram. The uniformity of the region histogram is established by counting the number of "populated" bins $N_{pop}$ (i.e., those bins whose pixel count exceeds a threshold $T_P$) and comparing this total to a predetermined threshold $T_C$. If $N_{pop}$ exceeds $T_C$, the region is classified as a continuous-tone region; otherwise, it is labeled as non-contone.

In some embodiments, the candidate regions denoted in FIG. 6(b) are verified using region properties. In some of these embodiments, these properties are area and luminance distribution. Small regions labeled by the local measures as contone are more likely to be mislabeled than are large connected regions. Region area may be used to either identify or remove text elements. These areas may be removed, in some embodiments, using a threshold $T_A$ derived from the page width as $(0.1 \times \text{page width})^2$. The second property is used to find pictorial contone regions.

Figure 7A:
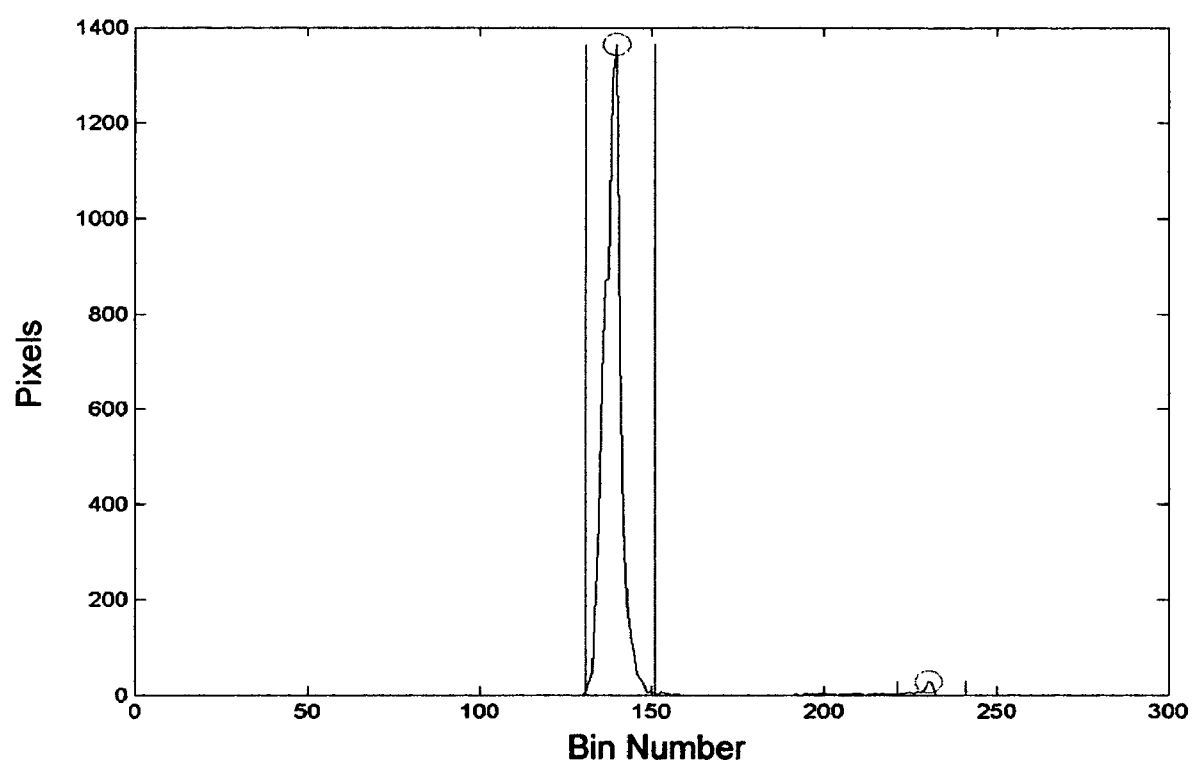
FIG. 7(a) shows a luminance histogram of a spot color region.
Figure 7B:
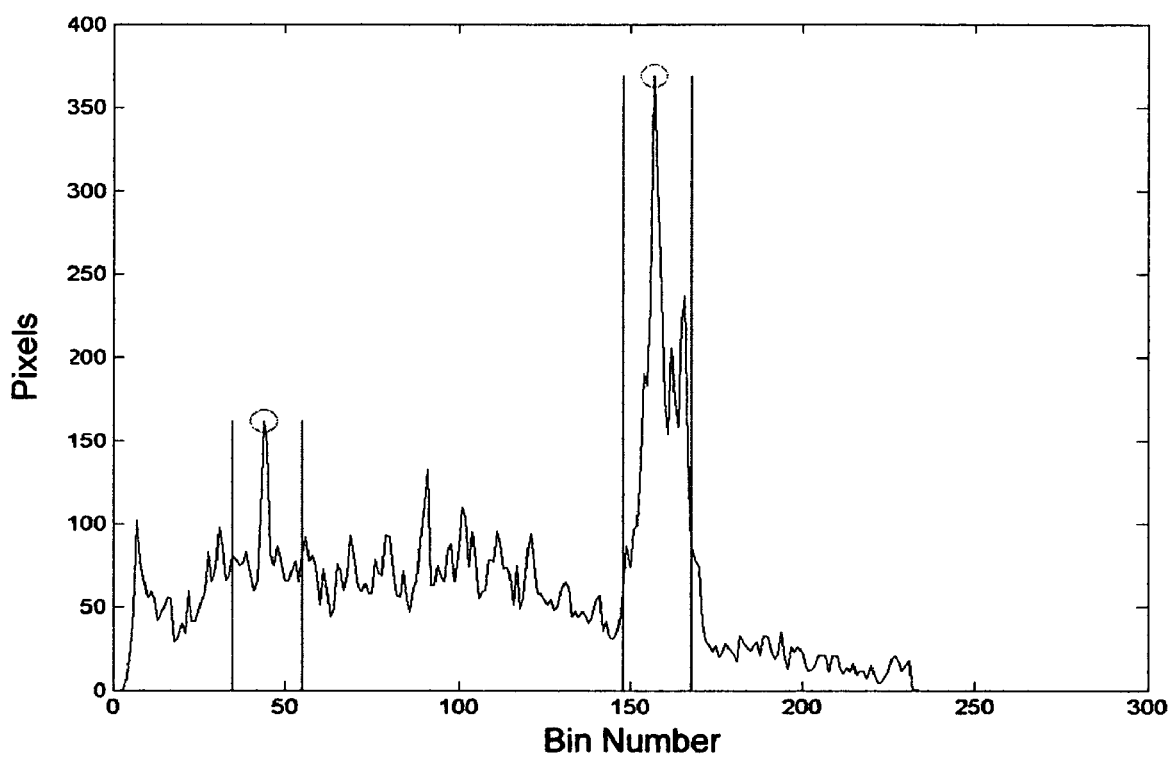
FIG. 7(b) shows a luminance histogram of a contone image region.

FIG. 7 shows the luminance histograms for a spot color region (a) and pictorial region (b). The histogram for the spot color shows the values are largely located around a single peak, while the histogram of the pictorial region is more evenly distributed. Some embodiments of this verification procedure eliminate the histogram counts around the two largest peaks in the histogram. The pictorial contone verification procedure eliminates the counts of the pixels around the two dominant peaks for the region histogram then sums the remaining bins to determine if a significant number of pixels don't belong to a bi-modal distribution. In some embodiments, the bi-modal distribution model used is one from studying the luminance distribution from inverted text samples. If the region has enough luminance levels outside of this model, then the region is considered pictorial contone. In FIG. 7(b) the regions between the lines centered around the peaks correspond to the bins eliminated from the summation.

Figure 8:
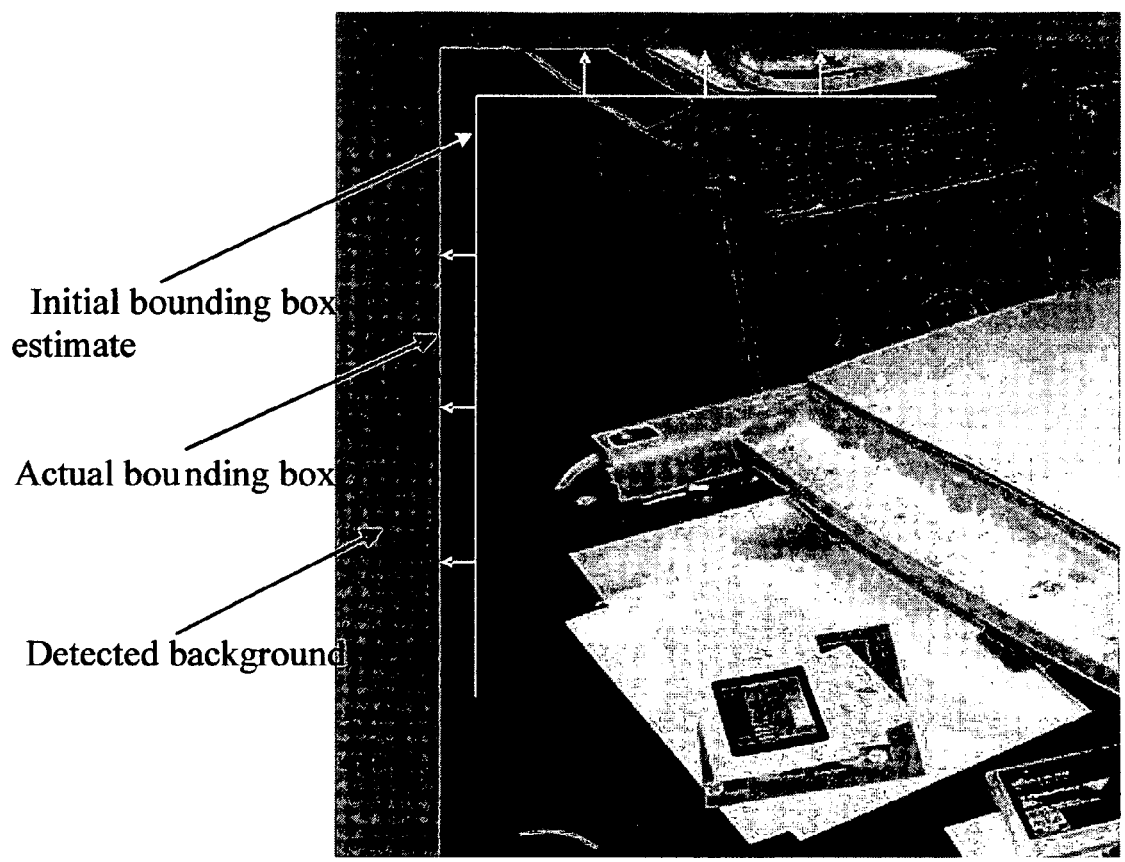
FIG. 8 shows elements of refinement of detected region boundaries.

After classification 26, the boundaries of the identified continuous-tone regions need to be refined and more accurately located. Due to the initial downsampling operation and subsequent morphological processing, the bounding boxes of the detected regions do not correspond to the correct region boundaries in the original image. To refine the boundaries, the detected bounding box coordinates are first projected to the original image size 28. The size of the bounding boxes may be reduced by a fixed amount, to ensure that the detected bounding box is always smaller than the actual bounding box of the region. Each side of the detected bounding box is then expanded outward, until a termination criterion is met. In some embodiments, the termination criterion compares the pixels added in each step of the expansion process to the detected background values. If the number of background pixels in the added row/column exceeds a certain number, expansion in that particular direction is terminated. FIG. 8 depicts how bounding box refinement is accomplished.

Once bounding box refinement is completed, the detected contone regions are recursively processed using the steps described above, until no valid background is identified for a given region. The continuous-tone detection processes are applied to (sub)regions in the document image recursively until a predetermined termination criterion is met. The recursive approach enables the algorithm to handle multiple and nested local background regions in the document, thereby allowing the accurate detection of the boundaries of all continuous-tone content on the page.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. An image segmentation method, said method comprising:
   a) obtaining pixel attribute data for a mixed-content image, said pixel attribute data comprising at least one of a luminance data, a chrominance data and a hue data;
   b) downsampling said pixel data;
   c) filtering said pixel data to remove noise;
   d) computing a local discriminating feature, selected from the group consisting of standard deviation and spread, to identify a text region in said image, wherein a region is identified as text when said feature is above a local feature threshold value;
   e) analyzing a luminance histogram of said image to identify a background region in said image, wherein a region is identified as background when an initial maximum histogram bin containing the highest number of pixels exceeds a background threshold value;
   f) verifying said background region analysis using region chrominance data;
   g) labeling any background regions as such;
   h) analyzing areas in said image outside any of said background regions and outside any of said text regions to identify contone regions;
   i) verifying said contone regions using region properties, wherein said contone regions are eliminated when a contone region's area is smaller than the square of one tenth of the page width;
   j) analyzing said contone regions to identify text regions present within said contone regions;
   k) analyzing said contone regions to identify background regions present in said contone regions;
   l) analyzing areas in said contone regions outside any of said background regions and outside any of said text regions to identify contone sub-regions;
   m) repeating steps e-g until no further sub-regions are found; and
   n) analyzing said contone regions and said contone sub-regions to identify pictorial contone regions and non-pictorial contone regions.

2. An image segmentation method, said method comprising:
   a) obtaining pixel attribute data for a mixed-content image;
   b) identifying a text region in said image;
   c) identifying a background region in said image, wherein said identifying comprises:
      i) calculating a luminance histogram for said image,
      ii) identifying a histogram bin containing a maximum number of values,
      iii) comparing said maximum number of values to a threshold value, and
      iv) classifying a pixel as background if said pixel correspond to said histogram bin and said maximum number of values is greater than said threshold value;
   d) analyzing areas in said image outside any of said background regions and outside any of said text regions to identify contone regions, wherein said analyzing comprises:
      i) calculating an area luminance histogram for said areas not classified as background or text,
      ii) determining a number of populated histogram bins whose pixel count exceeds a threshold value,
      iii) comparing said number of populated histogram bins to a bin number threshold value,
      iv) classifying said area as a contone region when said number of populated histogram bins exceeds said bin number threshold value;
   e) analyzing said contone region to identify any text regions present within said contone regions;
   f) analyzing said contone regions to identify any background regions present in said contone regions;
   g) analyzing areas in said contone regions outside any of said background regions and outside any of said text regions to identify contone sub-regions;
   h) repeating steps e-g until no further sub-regions are found;
   i) removing any contone regions whose area is smaller than one tenth of the square of the page width.

* * * * *